(No Model.)

J. S. BRETZ.
BICYCLE WHEEL.

No. 478,394. Patented July 5, 1892.

WITNESSES:

INVENTOR:
Jacob S. Bretz,
By his Attorney
Horace Pettit

THE NORRIS PETERS CO., PHOTO-LITHO., WASHINGTON, D. C.

UNITED STATES PATENT OFFICE.

JACOB S. BRETZ, OF PHILADELPHIA, PENNSYLVANIA.

BICYCLE-WHEEL.

SPECIFICATION forming part of Letters Patent No. 478,394, dated July 5, 1892.

Application filed October 14, 1891. Serial No. 408,636. (No model.)

*To all whom it may concern:*

Be it known that I, JACOB S. BRETZ, of the city of Philadelphia and State of Pennsylvania, have invented a certain new and useful Improvement in Wheels for Bicycles and other Vehicles; and I declare the following to be a full, clear, and exact description thereof, reference being had to the accompanying drawings, forming part of this specification.

My invention has relation to wheels for bicycles and other vehicles; and it consists in the device hereinafter particularly described and claimed.

The object of my present invention, as in the invention described in Letters Patent No. 457,861, issued to me August 18, 1891, for an improvement in wheels, is to obviate and overcome the angular strain on the hub in wheels having wire or metal tangential spokes; also, to enable the spokes to be secured to the hub without bending or twisting.

A further object of my present invention is to provide a construction wherein the parts may be readily and speedily assembled and the cost of manufacture reduced to a minimum, at the same time providing for strength and rigidity of construction.

In the accompanying drawings similar letters of reference refer to similar parts throughout.

Figure 1:
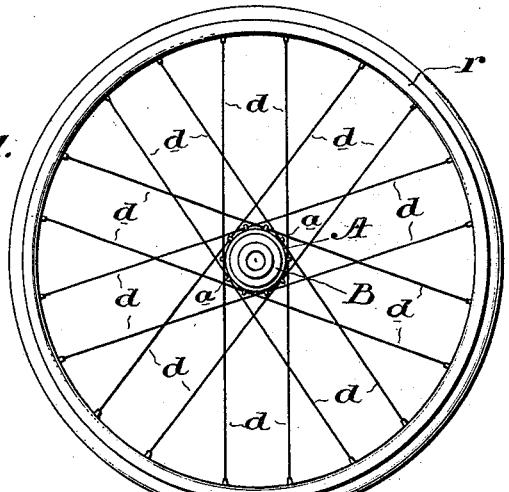
Figure 2:
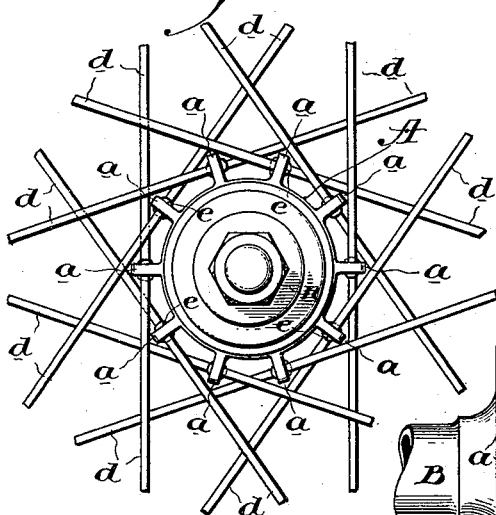
Figure 4:
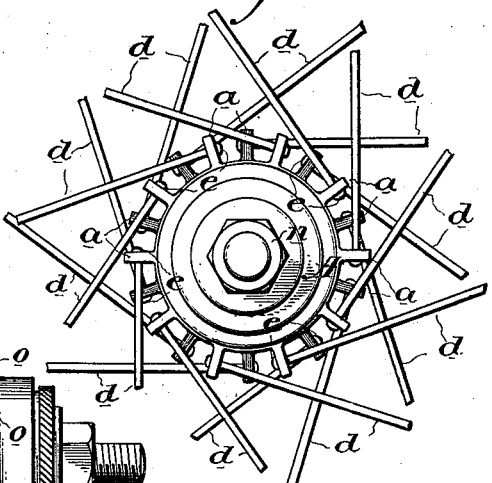
Figure 5:
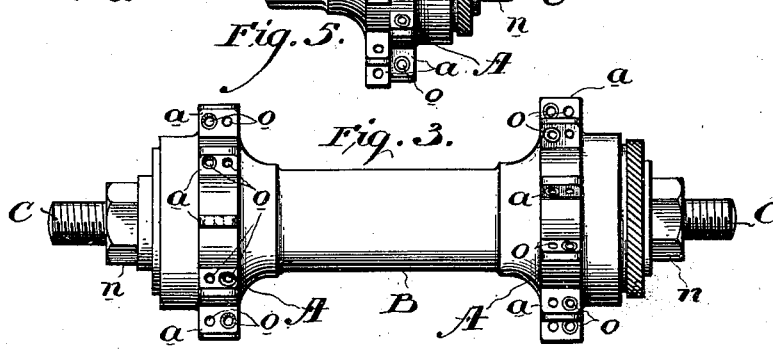
Figure 3:
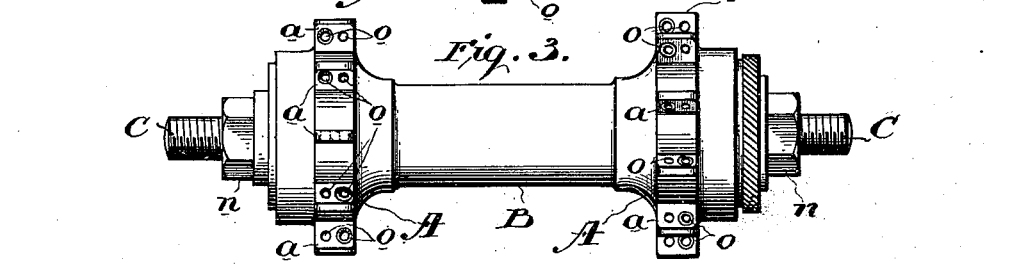

Figure 1 is a side elevation of my improved wheel. Fig. 2 is an enlarged detail view showing the spokes secured to the hub, two spokes being secured to each spur or tooth extending in opposite directions. Fig. 3 is a perspective view of the hub of the construction shown in Fig. 2 with the spokes detached. Fig. 4 is an enlarged detail view, as in Fig. 2, but showing a construction wherein each spoke is secured to an independent spur or tooth. Fig. 5 is a perspective section showing the construction illustrated in Fig. 4 with each alternate spur disposed to one side to prevent the spurs from interfering with the line of the spokes.

A A are the outer portions of the hub, united together through the medium of the sleeve B, the whole forming a rigid hub adapted to revolve on the axle C, being preferably provided with ball-bearings of the usual construction and secured in position on the axle C through the medium of the nuts $n$ or by other suitable means.

Upon the circumference of the hub-sections A are provided radiating spurs $a$, which said spurs $a$ are transversely drilled with the orifices $o$ for the reception of the spokes $d$, said orifices being preferably reamed on one side to receive the rivet head or end $e$ of the spokes $d$. The spurs $a$ may be provided with one or more orifices $o$ for the reception of one or more spokes $d$; but the preferable construction is that having two orifices in each spur for securing but two spokes, having their rivet-heads $e$ on opposite sides of the spur and extending to the rim $r$ of the wheel in opposite directions. The spokes are secured to the rim at the other end by a nut and screw-thread or by other suitable means. Each spoke in the construction of the wheel is readily and easily passed through the orifice $o$, provided in the spurs $a$, and it is then in a position in the hub to be screwed or otherwise rigidly secured to the rim at its outer end, and when all the spokes are properly adjusted to the proper tension a wheel of great strength and rigidity is secured. The spokes are preferably tangentially disposed. As previously stated, each spoke may be secured to an independent spur, in which case each proximate spur preferably secures spokes extending in substantially opposite directions. In this construction in order to allow the spoke to remain at a right angle to the face of its spur and to clear the spur next to that to which it is secured each set of spurs is preferably arranged in two proximate series alternately disposed. In the preferable construction two spokes, extending in opposite directions, are secured to the same spur with their heads engaging on opposite sides of the same spur. The tension of the two spokes thus operating in opposite directions readily secures the hub in its proper relative position to the rim and provides great rigidity of construction.

A most important part in the manufacture of bicycle-wheels, which consumes a great deal of labor, time, and expense, is the assembling of the spokes to the hub and to the rim, as much care must be exercised in "truing" and securing the proper tension of the parts, as in a metallic wheel the employment of a multiplicity of wire spokes is necessary in order to give sufficient strength and rigidity. In the class of wheel heretofore invented, where the spoke is secured to the hub-flange directly without angular strain, the construction has been such as to require the employment of much time in assembling the spokes to the flange. My invention described in Letters Patent No. 457,861 more clearly approaches a construction of hub-flange to allow of this speedy and accurate assembling, my present invention being, more particularly speaking, an improvement upon my said former invention. I do away in my present invention with all screw-threading in the securing of the spoke to the flange and rely upon a head $e$, provided on the inner end of the spoke $d$. The spurs $a$ are provided with smooth-bored orifices $o$ of a diameter slightly greater than the exterior diameter of the spoke $d$, the said spurs being arranged on the circumference of the hub-flange at such intervals apart as will allow of the unobstructed insertion of the outer end of the spoke $d$ and the ready threading or running through of the entire spoke up to the head $e$, provided on the inner end of the spoke in the manner of sewing. The orifice $o$, as hereinbefore stated, is preferably reamed to allow of the entrance of the head $e$, so that a smooth surface with that side of the spur may be presented. In this my improved construction of wheel herein described it is estimated that one man in the assembling of the spokes to the hub can accomplish the work of three or four men operating upon other constructions of this class of wheel heretofore invented, at the same time providing a superior wheel for strength and cost of manufacture. The spurs $a$ are preferably cast solidly with the hub-section A, though they may be otherwise constructed and secured thereto. Where each spoke is secured to an independent spur, as shown in Figs. 4 and 5, the diameter of the hub-section A should be preferably greater to provide sufficient circumferential area for the additional number of spurs.

Having thus described my invention, what I claim, and desire to secure by Letters Patent, is—

1. In a wheel, the combination of a hub having a series of integral independent spurs $a$ radiating therefrom, each of the said spurs being provided with smooth-bored orifices $o$, and spokes $d$, inserted through said orifices, tangentially disposed to the hub, said spokes provided at their inner ends with heads $e$, which impinge against the side of the spurs, the outer ends of the spokes being secured to the rim of the wheel, substantially as described.

2. In a wheel, a metallic hub consisting of the central section B and end flanges A, two series of integral independent spurs $a$, provided circumferentially upon each flange A, radiating therefrom, each spur of a series alternately disposed at one side of the circumferential line of the adjoining series of spurs, each of the spurs provided with a smooth-bored orifice $o$, and spokes tangentially disposed inserted through said orifices and provided at or near their inner ends with heads which impinge against the sides of the spurs, substantially as described.

In witness whereof I have hereunto set my hand this 5th day of October, A. D. 1891.

JACOB S. BRETZ.

Witnesses:
   JAMES B. GIVIN,
   HORACE PETTIT.